Feb. 25, 1969   W. SEABLOM   3,429,593

PIPE FITTING CONSTRUCTION

Filed Aug. 15, 1966

INVENTOR.
Wendell (NMI) Seablom
BY
*Flehr & Swain*
Attorneys

United States Patent Office 3,429,593
Patented Feb. 25, 1969

---

3,429,593
PIPE FITTING CONSTRUCTION
Wendell Seablom, Santa Rosa, Calif., assignor to Controlled Mercury Switch Corporation, Santa Rosa, Calif., a corporation of California
Filed Aug. 15, 1966, Ser. No. 572,562
U.S. Cl. 285—247                                              5 Claims
Int. Cl. F16l 21/08, 47/00

ABSTRACT OF THE DISCLOSURE

A pipe fitting construction having an interiorly disposed locking insert for locking the pipe, fitting, and insert together to preclude relative rotation between any two. A nut having tapered wedging surfaces cooperates with wedging surfaces on the fitting at two locations longitudinally thereof.

---

Background of the invention and objects

This invention relates to pipe fittings and more particularly to pipe connection devices such as couplings, L's, T's, unions and the like.

In general, it is an object of the invention to provide means for forming an improved pipe fitting construction.

A further object of the invention is to provide such a device wherein a plurality of sealed zones are developed and enhanced within the bore of a union under longitudinal thrusting action of a compression nut thereon and wherein the formation of a seal at one zone contributes to formation of a seal at another zone.

Another object of the invention is the provision of a nut for a pipe union wherein the longitudinal movement of a nut serves to apply forces to form a first sealed zone, longitudinally move the pipe to engage a surface forming a second sealed zone; and further, to apply radially inward compression around the second zone to additionally enhance the seal thereat.

A further object of the invention is the provision of a locking insert which serves to preclude release due to plastic flow sometimes encountered with plastic pipe when subjected to prolonged compression.

These and other objects of the invention will be more readily apparent from the following detailed description of a preferred embodiment thereof when considered in conjunction with the drawings.

Summary of the invention

In general, a pipe fitting construction has been provided which is primarily useful in forming a pipe joint with a length of cylindrical tubing having a smooth outer peripheral surface at one end thereof. A fitting to be coupled to the end of the tubing is provided herein, such as a union. The fitting includes an elongated tube-engaging body portion including a generally right cylindrical bore. The bore is dimensioned to receive the end of the tubing introduced in a manner to coaxially extend a predetermined distance into the bore. The inside surface of the bore includes a surface region circumferentially uninterrupted and which extends along the bore so as to define a sealing zone adjacent the smooth outer peripheral surface of the tubing. The fitting is made of a material which, while hard, includes a limited degree of resilience whereby, as will be seen further below, it can be compressed within its elastic limit to form a seal about the outer surface of the tubing and yet permits the fitting to provide a demountable coupling.

The inside surface of the bore includes a generally radially inwardly protruding shoulder or abutment extending circumferentially uninterruptedly around the bore to form a sealing surface or seat adapted to cooperate with the inserted end of the cylindrical tubing so as to form a seal therebetween. The circumferential surface of the bore adjacent to the abutment converges slightly radially inwardly of the bore so as to be adapted to form an interference fit with the end of the tubing. Thus, while the first sealing zone may be at the outer end of the bore of the union, a second sealing zone exists in the region of the abutment.

A nut member threadedly carried around the body portion for movement axially along the body of the union acts upon both sealing zones. Thus, a first pair of slidably cooperating smooth wedging surfaces, formed respectively around the interior of the nut member and around the outside of the body portion of the union at a point laterally of the outer sealing zone have been provided. The first pair of wedging surfaces serves, under axial movement of the nut member, to apply a radially inward compression to the pipe and also a sufficient axially inward longitudinal movement to the pipe to form, not only a seal between the smooth outer surface of the tubing and the inner surface of the bore at the outer end thereof, but also to engage the inserted end of the tubing with the sealing surface of the abutment so as to form a seal at the second sealing zone.

A second pair of slidably cooperating smooth wedging surfaces have been formed respectively around the interior of the nut member and around the outside of the body portion of the union at a region laterally of the abutment within the bore. This second pair of wedging surfaces serves, under further axial movement of the nut member along the union, to circumferentially radially inwardly compress the union in the region of the abutment zone to constrict the bore to a degree sufficient to enhance an uninterrupted seal circumferentially around the bore at the second sealing zone thereof.

From the foregoing general description, it will be readily apparent that the action between the nut and union in forming a sealing zone at one portion of the union serve to induce improved sealing at another sealing zone defined within the union.

Description of the preferred embodiment

Figure 1:
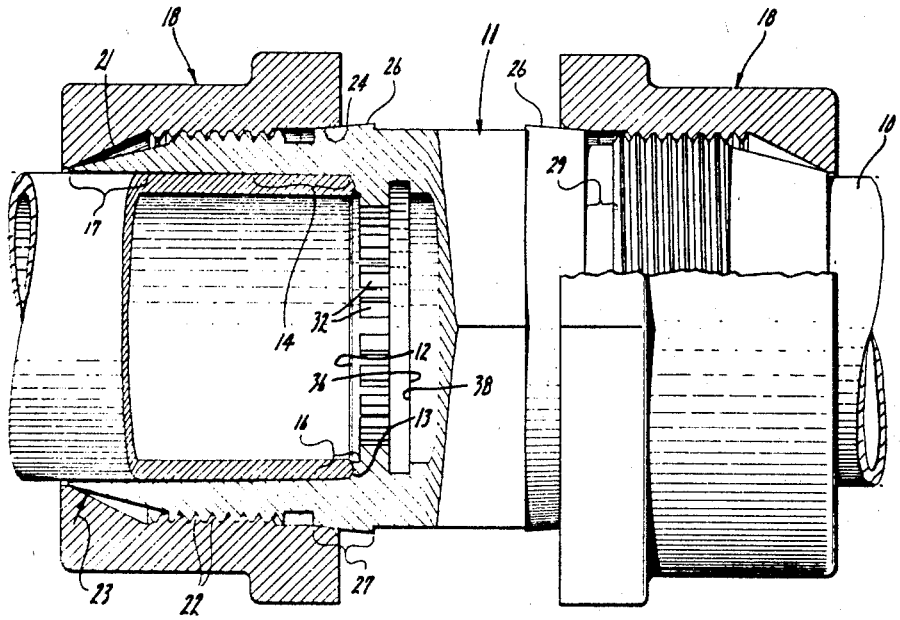
FIGURE 1 is a side elevation view, partially broken away, of a pipe fitting construction according to the invention.
Figure 2:
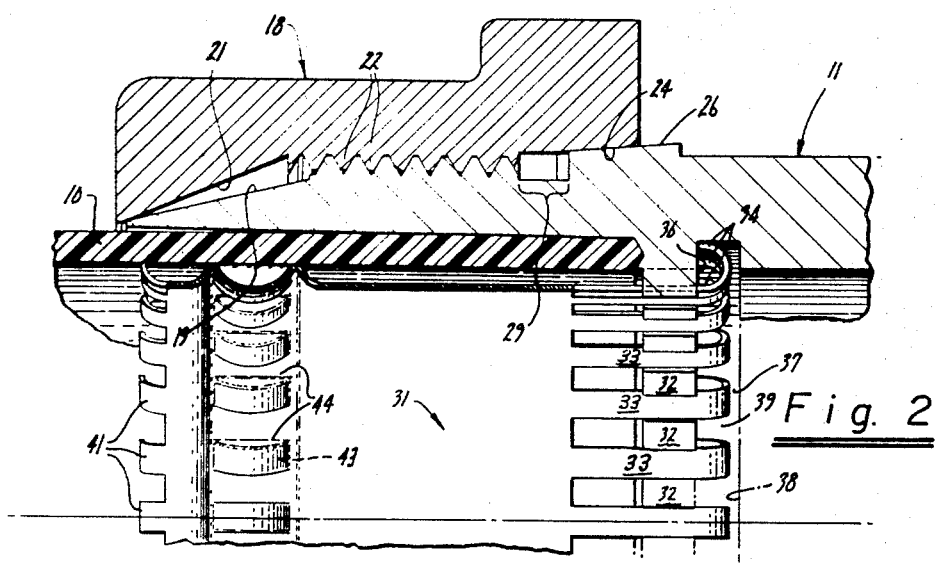
FIGURE 2 is a side elevation view, partially broken away, of the fitting of FIGURE 1 but employing an insert member.
Figure 3:
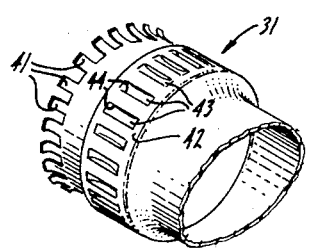
FIGURE 3 is a perspective view, on a reduced scale, of a metal insert member employed as shown in FIGURE 2.

As more particularly now to be described and with particular reference to the drawings, a fitting for forming a pipe joint construction with the end of a length of cylindrical tubing 10 having a smooth outer peripheral surface at one end thereof is shown in FIGURE 1. A union 11 is adapted to couple together the ends of a pair of such lengths of tubing 10.

Union 11 is preferably of a slightly deformable, relatively hard material, such as one of several suitable plastics, for example, poly vinyl chloride, or P.V.C.

Union 11 includes an annular body portion formed with an elongated bore therein. The inside surface of the bore includes a generally radially inwardly protruding abutment 12 extending circumferentially uninterruptedly around the bore to form a sealing surface adapted to cooperate with the bevelled end edge 13 of tubing 10. The sealing surface of abutment 12 has been formed to incorporate a V-shaped cross-section wherein the included angle between the arms of the V can run on the order of 120° and corresponds to the angle of bevelled edge 13. Thus, the sealing surface of abutment 12 is at an abruptly inclined angle to the axis of tubing 10.

The walls of the bore of union 11 taper slightly, for example, on the order of 1°, inwardly from the outer end of the bore so as to be adapted to provide the circumferential surface 14 of the bore adjacent abutment 12 with an interference fit with the smooth outer peripheral surface of tubing 10. Such interference fit, for example, can provide a bore diameter of 0.3 inch less than the outer diameter of the inserted tubing 10 for a tubing having an outside diameter on the order of 1½ inches.

A sealing zone 16 is thereby formed by the bore surfaces adjacent and including the sealing surface of abutment 12. At the outer end of the bore, as distinguished from zone 16 which is relatively remote from the outer end of the bore, another sealing zone 17 has been formed by a surface region circumferentially uninterrupted and extending axially along the bore to define zone 17 adjacent the smooth outer peripheral surface of the pipe.

A compression nut 18 is threadedly carried around the body portion of union 11 for movement axially therealong. A first pair of slidably cooperating smooth wedging surfaces 19, 21 are respectively formed around the interior of nut member 18 and around the outside of the body portion of union 11 at an axial position laterally of sealing zone 17. Wedging surfaces 19, 21 respectively taper at an angle, for example, on the order of 11°–15° for surface 19, and at an angle on the order of 25° for surface 21. Thus, as nut member 18 is rotated upon threads 22, the body portion of union 11 will be compressed in a direction as defined, for example, by the arrow 23. Accordingly, the wedging surfaces 19, 21 serve, under axial movement of nut member 18, to apply radially inward compression to tubing 10 and also sufficient axially inward longitudinal movement to tubing 10 to engage the bevelled end edge 13 with the sealing surface of abutment 12 thereby forming a seal at zone 16. This, of course, assumes that tubing 10 has been inserted into the bore of union 11 sufficiently whereby it is relatively close to, and preferably in engagement with, abutment 12 before applying such radially and axially inward compression by means of nut member 18.

A second pair of slidably cooperating smooth wedging surfaces 24, 26, respectively formed around the interior of nut member 18 and around the outside of the body portion of union 11 in a compression region 27 laterally of abutment 12 serve, under further axial movement of nut member 18, to circumferentially radially inwardly compress region 27 to constrict the bore to a degree sufficient to enhance and ensure an uninterrupted seal circumferentially around the bore at zone 16.

Thus, after bevelled edge 13 of tubing 10 has been urged toward abutment 12, in the event that contact between the surfaces of edge 13 and the sealing surface of abutment 12 is initially relatively light, the further radially inward compression applied by the action of wedging surfaces 24, 26 increases the degree of engagement between surfaces of abutment 12 and edge 13 to preclude leakage which might otherwise occur.

Wedging surfaces 24, 26 are disposed at an angle on the order, for example, of 5° to the axis of the bore.

A pipe fitting construction as above described may be assembled and functions as follows.

The bevelled end of a length of tubing 10 having a smooth outer peripheral surface is inserted into the bore of union 11 and well into the region 14 wherein it encounters an interference fit with the bore. Tubing 10 is forced longitudinally into the bore as far as possible and preferably into engagement with the sealing surface of abutment 12. It is assumed, however, that such engagement is under insufficient compression as may permit leakage from union 11 in those instances where fluids, for example, are being handled under high pressure. Thus, to enhance the sealing between end edge 13 and abutment 12, nut member 18 is threadedly advanced along union 11 until wedging surfaces 19, 21 become slidingly engaged. Such sliding engagement between surfaces 19, 21 radially inwardly compresses the body portion of union 11 at zone 17 to form a seal around tubing 10 thereat. Tubing 10 is also carried longitudinally along the bore by the action of nut member 18 so as to increase the compression applied between the sealing surfaces of abutment 12 and end edge 13.

As nut member 18 is further threadedly advanced longitudinally of union 11, the wedging surfaces 24, 26 slidingly cooperate to apply radially inward compression to the seal formed in zone 16.

Nut member 18 and union 11 are formed and disposed with respect to each other to permit nut member 18 freedom to move axially until limited for all intents and purposes only by refusal developed between one, or the other, or both pairs of wedging surfaces 19, 21 and 24, 26. It will, therefore, be noted that sufficient threads 22 have been provided along with an annular gap or clearance 29 formed annularly around union 11 between the commencement of surface 26 and the end of threads 22 to permit nut member 18 to move axially along union 11 without abutting or encountering surfaces, other than the wedging surfaces 19, 26.

From the foregoing, it will be readily evident that a seal is provided in zones 16 and 17 and that the seal at zone 16 is enhanced by compression applied by the edging surfaces 24, 26. The action between wedging surfaces 19, 21 serves to aid in the forming of the seal at zone 16 as well as in the formation of a seal at zone 17.

While the construction as described above works particularly well with metal pipe, it has been found that with certain plastic pipe materials there will be experienced after prolonged compression of the pipe, a limited degree of cold flow of the pipe material which will thereby tend to loosen the seal formed between the pipe and the fitting. Accordingly, under such conditions, a sudden surge in the pressure of the line so sealed or a vibratory working of the joint can conceivably form a leak at the coupling. A relative twisting movement between the pipe and union 11 has been found to be somewhat more deleterious than other action.

As now to be described, a metal insert member 31 can be carried within the bore of union 11 to take advantage of any cold flow of the pipe material so as to lock the pipe rotationally with respect to union 11 nd thereby preclude twisting therebetween.

Insert member 31 is of a generally annular configuration and adapted to be carried within the bore of union 11 and to be telescopically received within pipe 10. Means for rotationally locking member 31 with respect to the bore of union 11 so as to preclude relative rotation therebetween includes a number of circumferentially spaced lands 32 formed to protrude radially inwardly of abutment portion 12. A number of radially yielding and longitudinally extending fingers 33 are disposed in the grooves formed between lands 32 whereby relative rotation between member 31 and union 11 is precluded. The inner ends 34 of fingers 33 are turned radially outwardly to engage the rear surface of abutment portion 12. As thus arranged, member 31 can be slidably moved axially into the bore of union 11 until the ends 34 pass beyond the lip 36 formed on the rear side of abutment portion 12. Further axially inward movement of member 31 is defined by the spacing 37 between the ends 34 of fingers 33 and the inner side edge 38 of the groove 39 which receives ends 34.

The inner end of member 31 is also formed with resilient outwardly projecting fingers 41 adapted to engage and, to a limited degree, dig into the plastic material of pipe 10. Fingers 41 are, therefore, disposed generally laterally adjacent sealing zone 17 whereby radially inward compression applied by the action of wedging surfaces 19, 21 further serves to develop engagement between the tips of fingers 41 and the inside surface of pipe 10.

Means for precluding relative rotation between pipe 10 and insert 31 includes the radially enlarged portion or band 42 which extends circumferentially around insert member 31 so as to lie immediately adjacent the inner surface of pipe 10. A number of depressions 43 having sharp edges 44 serve to receive, by cold flow, the plastic material of pipe 10 when the latter is under prolonged compression of nut member 18. Thus, pipe 10 positively engages insert member 31 and relative twisting movement therebetween is precluded.

Insert member 31 is preferably comprised of a metal such as spring steel or spring brass which will retain its shape under conditions where the plastic material of pipe 10 moves by cold flow into pockets 43.

From the foregoing, it will be evident that there has been provided a pipe fitting construction capable of accommodating a wide range of pipe materials and forming a seal therewith.

I claim:
1. For pipe fittings and the like of a type for coupling to a length of cylindrical tubing having at an end thereof a smooth outer peripheral surface, a union comprising a first member having an annular body portion, an elongated bore formed within the body portion and adapted to receive the tubing, the inside surface of said bore including a first surface region circumferentially uninterrupted and extending axially along the bore to define a first sealing zone around the bore adjacent the smooth outer peripheral surface of the tubing, a generally radially inwardly protruding abutment extending circumferentially uninterruptedly around the bore to form a second sealing zone including a sealing surface adapted to cooperate with the end edge of the tubing in forming a seal therebetween, the circumferential surface of the bore adjacent said abutment being adapted to form an interference fit with the tubing, a first smooth wedging surface defined around the outside of said body portion and axially disposed laterally of said first sealing zone, said first wedging surface being oriented to dispose an initial axial extent thereof to present increasing radial displacement from the bore with increasing axial displacement from the outer end of the bore, a second smooth wedging surface defined around the outside of said body portion and axially disposed laterally of said abutment, a nut member movable along the outside of said body portion and including a third wedging surface disposed to slidably cooperate with said first wedging surface to provide forces acting both radially and axially inwardly of the bore to respectively circumferentially compress the first sealing zone of the bore against the smooth outer peripheral surface of the tubing and to urge the tubing axially along the bore into sealing relation between said abutment and said end edge of the tubing to form an uninterrupted circumferential seal between the tubing and bore at both said first and second sealing zones under said forces respectively, said nut member further including a fourth wedging surface disposed to slidably cooperate thereafter with said second wedging surface to circumferentially radially inwardly compress a region of the body portion laterally of said abutment to a degree forming an uninterrupted seal circumferentially of the bore between said end edge of the tubing and said sealing surface, and means between said third and fourth wedging surfaces for drawing said second member axially along said body portion to engage said wedging surfaces, said first and second members being formed and disposed with respect to each other to provide said second member freedom to move axially until limited substantially only by refusal developed between said wedging surfaces.

2. A pipe fitting construction for forming a sealed connection with a length of cylindrical pipe having a smooth exterior surface, said construction comprising a first member having an annular body portion including an elongated bore therein, a surface region circumferentially uninterrupted and extending axially along the bore to define a first sealing zone adjacent the smooth outer peripheral surface of the pipe, the inner surface of said bore being further formed, at a point relatively axially remote from the outer end of the bore, to include a circumferentially extending uninterrupted abutment portion including an inclined sealing surface adapted to cooperate with the end edge of said pipe in forming a second sealing zone therebetween, a nut member threadedly carried around said body portion for movement axially therealong, a first pair of slidably cooperating smooth wedging surfaces respectively formed around the interior of said nut member and around the outside of the body portion laterally of said first sealing zone, said first pair of wedging surfaces serving under axial movement of said nut member to apply radially inward compression to the pipe and sufficient axially inward longitudinal movement to the pipe to engage said end with the sealing surface of said abutment to form a seal therebetween at said second sealing zone, a second pair of slidably cooperating smooth wedging surfaces respectively formed around the interior of said nut member and around the outside of said body portion in a compression region laterally of said abutment portion, said second pair of wedging surfaces serving under further axial movement of said nut member to circumferentially radially inwardly compress said compression region to constrict said bore to a degree sufficient to enhance an uninterrupted seal circumferentially around the bore at said second sealing zone, said abutment being further formed to include radially inwardly protruding lands circumferentially spaced apart to form grooves therebetween, and a metal annular insert disposed within the end of said pipe, the outer end of said insert including fingers adapted to be disposed in said grooves, the ends of said fingers serving to engage the rear of said abutment portion to retain said insert within said bore, said lands serving to preclude relative rotation between said insert and said body portion, the periphery of said insert being formed to include a plurality of depressions distributed circumferentially therearound in a portion thereof adjacent the inner surface of said pipe to receive, by cold flow, material of the pipe when under compression to engage said pipe and said insert to preclude relative rotation therebetween.

3. A pipe fitting construction comprising a member having a body portion including a bore formed to slidably receive the end of a smooth tubular pipe of plastic material, the exterior of the body portion further including a first wedging surface, a nut threadedly engaging the body portion and having a second wedging surface formed therein to cooperate with said first wedging surface whereby advancing movement of the nut serves to apply radially and axially inward compression to the pipe, a metal annular insert adapted to be disposed coaxially within the end of said pipe, the periphery of said insert including a plurality of pockets distributed circumferentially therearound to receive by cold flow a portion of the mass of plastic pipe when under compression to lock said pipe and insert and preclude relative rotation therebetween, and means within said bore serving to positively lock said insert against rotation thereof with respect to said bore of said member to preclude relative rotation therebetween.

4. A pipe fitting construction according to claim 3 wherein the last named means includes a plurality of circumferentially spaced radially yielding and longitudinally extending fingers within said bore and lands therebetween formed with the body portion and protruding radially inwardly of the bore.

5. For a pipe fitting construction of the type for forming a seal with tubular plastic pipe, a metal annular insert adapted to be disposed within the end of the pipe, the outer end of the insert including circumferentially spaced fingers adapted to engage grooves within a fitting being coupled to the pipe and to positively lock the insert against rotation with respect to the fitting, the periphery of the insert being formed to include a radially enlarged portion adapted to lie adjacent the inner surface of the piper, and a plurality of depressions distributed circumferentially around said enlarged portion and adapted to receive, by cold flow, material of the pipe to rotationally lock the pipe and insert to preclude relative rotation between said insert and said pipe.

References Cited

UNITED STATES PATENTS

| | | | |
|---|---|---|---|
| 3,375,026 | 3/1968 | Szohatsky | 285—322 |
| 1,915,041 | 6/1933 | Wallace | 285—259 X |
| 2,479,499 | 8/1949 | Le Clair | 285—259 X |
| 2,761,704 | 9/1956 | Crawford | 285—249 X |
| 3,174,777 | 3/1965 | Lodholm et al. | 285—259 X |
| 3,295,870 | 1/1967 | Seablom | 285—343 X |

FOREIGN PATENTS

| | | |
|---|---|---|
| 816,069 | 4/1937 | France. |
| 1,123,385 | 6/1956 | France. |
| 309,529 | 6/1933 | Italy. |
| 646,992 | 10/1962 | Italy. |

THOMAS F. CALLAGHAN, *Primary Examiner.*

U.S. Cl. X.R.

285—259, 343, 322